3,369,993
ADMIXTURES OF ACID ACTIVATED CLAY AND ADSORBENTS IN THE DECOLORIZATION OF WAXES
Ivor W. Mills, Glenolden, Pa., and Wildon T. Harvey, New Castle, Del., assignors to Sun Oil Company, Philadelphia, Pa., a corporation of New Jersey
Filed Aug. 31, 1965, Ser. No. 483,992
18 Claims. (Cl. 208—26)

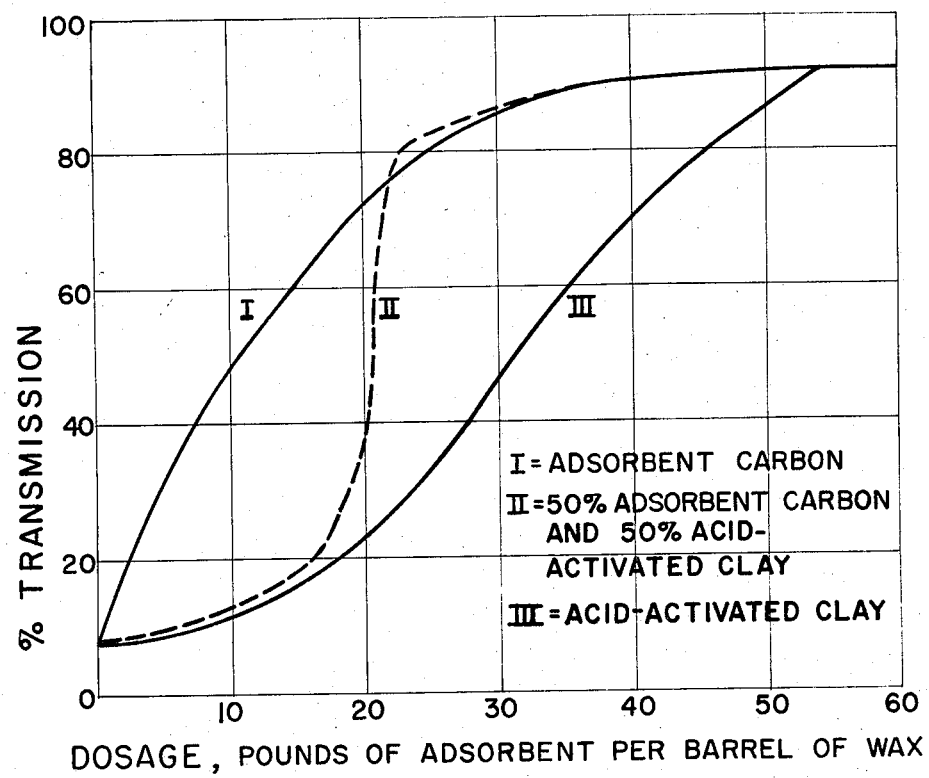

ABSTRACT OF THE DISCLOSURE

Colored petroleum wax (e.g., ASTM color greater than 4) is decolorized by diluting the wax with a non-polar solvent and contacting the resulting solution with an adsorbent admixture comprising at least one acid-activated adsorbent clay and a second adsorbent selected from the class consisting of naturally-occurring bleaching clays, adsorbent carbon, bauxite, and mixtures thereof. Decolorized wax can be produced having an ASTM color of less than 1.0 and/or having an ultraviolet absorbency of less than 0.15 measured at 280 millimicrons when extracted and tested by the Howard-Haenni-Joe Method. Novel three and four component admixtures (in parts by weight) that are of utility in the subject process are as follows:

(1) An admixture of from 20 to 84 parts of acid-activated adsorbent clay with from 15–79 parts of naturally-occurring bleaching clay and from 1–65 parts of adsorbent carbon;
(2) An admixture of from 20 to 85 parts of acid-activated adsorbent clay with from 10–75 parts of naturally-occurring bleaching clay and from 5 to 70 parts of bauxite;
(3) An admixture of from 20 to 89 parts of acid-activated adsorbent clay with from 10–79 parts of bauxite and from 1–70 parts of adsorbent carbon;
(4) From 20 to 86 parts of acid-activated adsorbent clay with 10–76 parts of naturally-occurring bleaching clay, 3–69 parts of bauxite and 1–67 parts of adsorbent carbon.

---

This invention relates to refining of crude petrolatum and petroleum waxes and is particularly concerned with the provision of improved methods for the more economical production therefrom of products of required market quality and/or the production of products of higher quality as to color, taste, and odor, for specialized uses. The invention also pertains to certain novel adsorbent admixtures which are particularly suitable for decolorizing petroleum waxes.

The present invention is particularly directed to the refining of high molecular weight wax recovered from crude oil fractions from which the lower melting waxes have been substantially separated. These higher melting waxes are primarily those known to the art as microcrystalline waxes and which are used in the manufacture of many products such as food containers, waxed papers, and coating materials where it is desired that they be impervious to moisture.

As a crude rule of thumb commercial waxes can be roughly classified into the high melting microcrystalline waxes obtained from residual fractions and the lower melting crystalline waxes obtained from distillate fractions; however, in the laboratory it has been found that distillate waxes may contain either large or small crystals, and distillate waxes melting as high as 174° F. have been obtained; whereas, "small crystal" waxes melting below 120° F., and even as low as 100° F., have been recovered from residiual fractions.

The term "distillate wax" is used herein to designate the petroleum waxes which are solids at about 80° F. and which on a commercial scale are usually obtained from relatively light petroleum fractions (e.g., boiling below about 900° F.), including gas oil and lubricating oil distillates, while the term "residual wax" is used herein to designate the petroleum wax normally obtained commercially from residues of petroleum.

The waxy petroleum hydrocarbons (melting from about 80° to about 200° F.) whether in distillate or residual or extract fractions, are usually recovered therefrom by crystallization. The so-obtained unrefined wax is frequently called slack wax and contains small amounts of oil and varying quantities of impurities which impart color which may be dirty yellow to dark brown or even black. The oil and impurities must be substantially removed before the wax is adapted for the normal uses to which it is put. Asphalt is frequently removed by propane extraction. Oil is removed from the wax by sweating or by solvent or emulsion deoiling, either before or after the wax is fractionated according to melting point. The remaining colored impurities are most frequently removed or reduced by hydrogenating or acid refining followed by contacting with a solid adsorbent.

It has now been found that distinct improvements in the decolorizing of petroleum waxes by treating with adsorptive materials can be obtained by diluting the colored impure wax with a substantially non-polar solvent and utilizing as the adsorbent material an admixture of an acid-activated adsorbent clay and one or more less acid adsorbent substances such as the naturally occurring bleaching clays, adsorbent carbon, and adsorbent bauxite.

When operating in accordance with the present invention a colored petroleum wax fraction (which preferably has been deoiled to less than 2% oil) is first dissolved in from 1 to 10 volumes of a substantially non-polar solvent and then treated with an adsorbent mixture as further described herein.

In accordance with this invention the decolorizing and deodorizing treatment results in the production of a refined wax having a lighter color and more improved odor for a given weight of adsorbent and contact time than is normally obtainable. This process is applicable to the decolorizing and deodorizing of all colored waxes and is especially advantageous in the refining of highly colored (brown to black) distillate and residual waxes which melt in the range from about 140° to about 200° F.

This invention is particularly beneficial in decolorizing black residual waxes which cannot by the usual methods of contact with adsorbents be economically refined to colors lighter than an ASTM color of one. Prior art processes for obtaining microcrystalline waxes with ASTM colors of less than one have generally required multiple contacting with large amounts of adsorbent, i.e., in the order of 100–200 pounds per barrel of wax, or have involved, in addition to contact with adsorbents, relatively expensive processing such as molecular distillation at about 5–15 microns absolute pressure, solvent extraction (as in U.S. Patent 2,168,330 where nitrobenzene is the extractant), or hydrogenation with fairly active catalysts and under relatively severe pressure and temperature conditions.

For example, the hydrogenation procedure disclosed in U.S. Patent 2,936,281 requires temperatures of about 550° F., pressure in the order of 500 pounds per square inch and a space velocity of around 1. Yet, even with such severe and expensive processing an ASTM color designation of 1+ is difficult to obtain and normally even relatively active catalysts give ASTM colors over 2.

A recent development which has intensified the need for an economical method of more efficient refining of petroleum waxes is the imposition by the United States Food and Drug Administration of more rigid standards of purity of waxes which are to be used in the food and drug industry. That is, a wax must not contain tetracyclic or higher polynuclear hydrocarbons if it is to be used in the United States in conjunction with pharmaceutical or food products.

Freedom from such polynuclear hydrocarbons is presently determined in commercial practice by an ultraviolet absorbence method developed by Lijinsky et al. as noted by J. W. Howard, E. O. Haenni and F. L. Joe, Jr., in an article at pages 304 to 315 of vol. 48, No. 2, of the Journal of the A.O.A.C. (1965). In this article the authors propose further refinements of the Lijinsky tests in order to produce a more practical procedure for use in routine quality control of waxes under regulations governing food additive uses. The ultraviolet absorbence tests proposed in the cited article will be hereinafter referred to as the "Howard-Haenni-Joe method." This method involves two distinct procedures, the first being an extraction followed by a series of absorbence measurements at various wave lengths. It is highly desirable in commercial practice to produce waxes which meet the Food and Drug Administration's absorbence standards on this first series of measurements since the second stage of the Howard-Haenni-Joe method involves chromatography and significantly increases the cost of quality control of food-grade waxes.

In routine commercial production of waxes for non-food uses, plant quality control of wax color is done by visually comparing a wax sample against a set of color standards using such well known procedures as the Tag-Robinson, the Saybolt (see ASTM D156–64 for details), or the ASTM D1500 method (see ASTM D1500–64 for details).

On the Saybolt scale −16 is an amber color, +21 is water white and +30 is the upper end of the scale. On the Tag-Robinson scale one is almost black, and 25 is a pale amber color equivalent to −2 Saybolt. On the ASTM scale 8 is a very dark red-brown and 0.5 is a pale amber color. The dark end (−16) of the Saybolt scale roughly corresponds to the lighter end (0.5) of the ASTM D1500 scale. Waxes which are darker than ASTM 8 may be measured in 15% by volume dilution with kerosine.

Presently known processing of high purity waxes for the food and drug industry generally involves first deoiling, then a chemical treatment of the deoiled wax fraction in order to remove reactive substances followed by contact with a relatively large quantity of a single adsorbent (e.g., in the order of 100–200 pounds per 300 pound barrel of wax) such as attapulgite which comprises a natural fuller's earth bleaching clay, or acid-activated sub-bentonite (montmorillonite) clay, synthetic gels (such as silica gel), activated carbon, bauxite, or synthetic aluminum silicates including the crystalline zeolite molecular sieves.

The usual methods that are employed for decoloring and deodorizing by means of adsorbent materials are either by percolation of the molten wax through a bed of an adsorbent material at temperatures sufficient high to keep the wax in a liquid state or by "contact filtration," in which procedure the wax is mixed with an adsorbent to form a slurry and the mixture is filtered in a conventional manner. Such conventional processing is illustrated by the methods of U.S. Patent 2,924,567.

On occasion the art has, owing to their great viscosity, diluted the residual waxes with a suitable solvent to increase their rate of percolation through the adsorbent bed. One such solvent is a petroleum naphtha which is characterized by having a 300–400° F. boiling range and a relatively low aromatic content. The use of such a petroleum naphtha in combination with the conventional adsorbents is taught in U.S. Patent 2,733,188.

Normally the chemical treatment, prior to addition of the adsorbent, is either mild hydrogenation at about 600° F. and 200 p.s.i.g., or, more commonly, contact with strong acids, such as 93% sulfuric acid, followed by neutralization and, usually, a preliminary filtration or decantation to separate the "pepper sludge" which may be produced by such acid refining. Such a decantation is taught in U.S. Patent 2,443,840.

In the decolorizing and deodorizing of highly colored residual waxes for the food and drug industry the prior art teaches that, before contact with an adsorbent, the wax must be so chemically treated. Normally in the United States, the molten wax is thus conventionally contacted with sulfuric acid at temperatures in the order of 160–180° F. using about 4–30 pounds of acid per 100 gallons of wax. Such acid treatment may be effected at lower temperatures (70–85° F.) if the wax is diluted with a solvent, such as propane, as taught, for example, in U.S. Patent 2,270,214. In addition to such acid treatment, multiple stages of adsorbent contact (such as is taught in U.S. Patent 2,273,726) are frequently necessary to produce microcrystalline waxes which will meet the Food and Drug Administration's ultraviolet adsorbence specifications. Multiple adsorbent contacting, either by slurry or percolation or combinations thereof, significantly increases equipment cost and processing time and when most residual waxes have been refined to below an ASTM color of 1.5, recontacting with comparatively large quantities of adsorbent produces only slight improvement in color.

Surprisingly, by practice of the present invention high purity waxes are produced by a single contact step utilizing about 15–130 pounds of an adsorbent admixture per 300 pound barrel of wax and no prior chemical treatment with hydrogen or concentrated mineral acid is normally necessary. In carrying out this procedure in accordance with the present invention, either the percolation method or the slurry and filtration method (which is frequently termed "contact filtration") or both can be utilized and the word "contact" as used herein (where the context admits) embraces both such practices; however, for a given dilution and quantity of adsorbent and for a given contact time and contact temperature, the slurry and filtration method appears to give somewhat better results than percolation, probably because of the greater available surface area due to the finer particle sizes of adsorbent which can be utilized in the slurry method.

The following examples will serve to illustrate the advantages of the present invention. Examples 1, 2, 14, 15, 16, and 17 along with the latter part of Example 5, are illustrative of practice in accordance with the teachings of the prior art and are intended to furnish "controls" against which the present invention, as illustrated by the remaining examples (especially Examples 3, 6, 7, 8, 11, 18, and 19), may be compared. Other examples, such as Examples 5, 1, 12 and 13 are primarily intended to illustrate the effect of altering reaction conditions, such as contact time, contact temperature, volume and type of nonpolar diluent, and the adsorbent dosage. Unless otherwise noted, pH is obtained by using a glass electrode and measuring the filtrate from an equilibrated 25% slurry in distilled water at 7° F., percentages are by weight, oil content is by ASTM method D721–56T, melting points are by ASTM method D127–60, and ASTM colors are of the molten wax as determined by ASTM method D1500–64.

*Example 1*

A deoiled residual black microwax fraction melting at about 193° F. and having an ASTM color considerably darker than 8 (a 15% by volume solution in kerosine has an ASTM color of 6.5) is obtained from a deasphalted heavy combined slack wax (e.g., crude oil distillation residue plus the extract from solvent dewaxing a lubricating oil fraction) by the process taught in U.S. Patent 2,783,183. This fraction boils primarily above about 970° F., contains 0.5% oil and has a penetration at 90° F. of 8, a Saybolt viscosity of 86 sec. at 210° F., and a density at 60° F. of 0.94 (0.788 at 210° F.). One 42-gallon (U.S.) barrel of this colored residual wax is diluted with one barrel of isooctane (2,2,4-trimethylpentane) while the system is being heated so that the resulting solution is at about 200° F., then 75 pounds of attapulgite are added to the solution and blended with a propeller mixer. The attapulgite used has a pH of 7.5 and is an aluminum magnesium silicate containing 20.1% volatile matter (i.e., removable by heating for 20 minutes at 1700° F.). When heated at 220° F. for 1 hour the weight loss is 13.3%. The volatile-free clay analyzes 69.9% $SiO_2$; 12.4% $Al_2O_3$; 11.2% MgO, 4.1% $Fe_2O_3$; and 2.2% CaO. Its apparent bulk density is 32 lbs./cu. ft. and it has particles sized such that 95% will pass through a 200 mesh screen. After 60 minutes contact with agitation at reflux (about 200° F.) the wax-adsorbent admixture is filtered; then isooctane (and water originally contained in the clay) is removed from the filtrate by distillation to produce a decolorized and deodorized refined wax. The so-refined wax has an ASTM color of 2.25.

*Example 2*

Example 1 is repeated except that the adsorbent used is a sulfuric acid-activated montmorillonite clay. This acid-activated clay has a pH of 2.7, contains 17.8% volatiles on ignition (as measured at 1700° F.) and has a weight loss of 6.7% at 220° F. On a volatile-free basis this clay analyzes 70.9% $SiO_2$, 17% $Al_2O_3$, 3.9% $Fe_2O_3$, 3.2 MgO, 1.6% CaO, 1.0% $Na_2O$ and/or $K_2O$, and 2.0% $SO_3$. The apparent bulk density is 45 lbs./cu. ft. and 90% of the particles will pass through a 200 mesh screen. The so-refined wax has an ASTM color darker than 8.

*Example 3*

The procedure of Example 1 is repeated except that the adsorbent used is a 1:1 weight ratio mixture of the attapulgite clay of Example 1 and the acid-activated clay of Example 2. The so-refined wax has an ASTM color of 0.75. This example, when compared with Examples 1 and 2, shows the unexpected improvement obtained when an impure wax diluted with a non-polar solvent is contacted with an adsorbent admixture of an acid-activated clay and a naturally occurring bleaching clay.

*Example 4*

Example 3 is repeated except that the isooctane is omitted and the wax contacted in the molten state with the adsorbent mixture. The so-refined wax has an ASTM color of 1.75. When this refined wax is recontacted for 90 minutes at 315° F. with 40 pounds of the adsorbent admixture, the wax produced has an ASTM color of 1. When this recontacting is done with 75 pounds of the adsorbent admixture the wax produced has an ASTM color of 0.75.

This example when compared with Example 3, shows the unexpected and beneficial result obtained when contacting the wax in dilution with a non-polar solvent (rather than in the molten state) with the adsorbent admixture.

*Example 5*

Example 3 is repeated except that 100 pounds of the adsorbent admixture is contacted with the colored wax. The so-refined wax has an ASTM color of 1.25.

A similar treatment using nine barrels of isooctane instead of one barrel produces a liquid wax with an ASTM color of 0.75. This refined wax, when tested by the first part of the Howard-Haenni-Joe method, has an ultraviolet absorbency of 0.34 at 280 microns but is acceptable for food and drug use since it has an adsorbency of 0.14 when tested after the chromatographic separation of the second portion of the Howard-Haenni-Joe method.

When the impure wax is diluted with nine barrels of isooctane and similarly contacted with 100 pounds of the attapulgite instead of the admixture of Example 3, the so-refined wax has an ASTM color of 2.25.

*Example 6*

Example 3 is repeated except that five pounds of an adsorbent carbon having a pH of 5.8, bulk density of 29 lb./ft.³, 5% ash, 30% moisture and sized such that 50% will pass through a 325 mesh screen is admixed with the 1:1 admixture of attapulgite and acid-activated clay. The so-refined wax has an ASTM color of 0.5. A refined wax having a still better ASTM color is produced when the adsorbent used is five pounds of the carbon in admixture with 75 pounds of a 1:3 weight mixture of the attapulgite and the acid-activated clay.

*Example 7*

The second portion of Example 6 is repeated except that the activated carbon adsorbent is added after the diluted wax has been in contact with the 1:3 adsorbent clay admixture for 30 minutes. The diluted wax is allowed to remain in contact with the adsorbent for an additional 30 minutes, then is filtered and a wax recovered as in Example 1. The so-refined wax has an ASTM color of 0.25 and an ultraviolet light absorbency of 0.09 at 280 millimicrons when extracted and measured by the first part of the Howard-Haenni-Joe method, that is, without the need for a chromatographic separation. The wax similarly meets all the other absorbency limits specified by the Food and Drug Administration of the U.S. Government without the need of additional separations.

When used in accordance with the present example, as little as one pound of adsorbent carbon per barrel of wax improves the ultraviolet absorbency of the resulting refined wax and dosages up to ten pounds per barrel give sufficient improvement to be of economic value. Adsorbent bauxite can be substituted for some or all of the attapulgite. The carbon can be added after an initial contact period of as little as 15 minutes.

*Example 8*

Example 3 is repeated except that the adsorbent used is an admixture of one part by weight of the attapulgite and three parts by weight of the acid-activated clay. The so-refined wax has an ASTM color of 0.5, a Saybolt color of −16, and an ultraviolet absorbence of 0.14 at 280 millimicrons when extracted and tested by the first part of the Howard-Haenni-Joe method.

No improvement in color is observed when the quantity of the adsorbent used in this example is increased to 100 pounds. When the adsorbent quantity is 50 pounds, the so-refined wax has an ASTM color of 5.0 and when the quantity of adsorbent is 25 pounds, the ASTM color is greater than 8.0 (but the wax product still is much lighter in color than the unrefined wax). The above indicates that, for a given impure wax, the optimum decolorization may be obtained in a relatively narrow dosage range of a given adsorbent admixture.

*Example 9*

When Example 3 is repeated using as the adsorbent 75 pounds of an admixture of one part by weight of attapulgite and 3 parts by weight of silica gel, the wax produced has an ASTM color greater than 8.0 and is nearly as black as the unrefined wax.

*Example 10*

Example 3 is repeated except that an equal volume of mineral spirits having a specific gravity of 0.784 at 60° F., a closed-cup flash point of 110° F. and a boiling range from 310°–400° F. is substituted for the isooctane. The adsorbent used is 75 pounds of the adsorbent admixture of Example 8 and the contact temperature is 300° F. The so-refined wax has an ASTM color of 0.75.

Example 11

Example 3 is repeated except that an equal weight of adsorbent bauxite is substituted for the attapulgite. The bauxite has a pH of 6.6 and contains 3% moisture. The so-refined wax has an ASTM color of 0.5 and a slightly improved odor over that of Example 3.

Example 12

Example 3 is repeated except that the adsorbent used is 50 pounds of the admixture of Example 8 and the impure wax which is refined is a distillate wax having a melting point of 152° F. (ASTM D87–57) and containing about 0.3% oil. The wax has an ASTM color of L 4.5, a penetration of 12 at 90° F., a specific gravity of 0.93 at 60° F. (0.76 at 212° F.), a Saybolt viscosity of 44.2 seconds at 210° F. and a boiling range of about 800 to about 1000° F. The so-refined distillate wax has a Saybolt color of +27.

Example 13

Example 12 is repeated except that only 25 pounds of the adsorbent admixture is used. The so-refined wax has a Saybolt color of +6 and is too light to measure by the ASTM D1500 method.

When 75 pounds of the adsorbent are used, the so-refined wax has a Saybolt color of +29.

Example 14

A residual wax fraction melting at about 153° F. and having an ASTM color in 15% dilution with naphtha of 4.5 is obtained from the deasphalted slack wax of Example 1 by the process taught in U.S. Patent 2,783,183. The wax contains 0.7% oil and has a penetration of 31 at 90° F., a specific gravity at 60° F. at 0.928 (0.795 at 212° F.) and a Saybolt viscosity at 212° F. of 77. A barrel of the wax is diluted with two barrels of a $C_4$ alkylate cut which is predominately comprised of trimethyl pentanes and having a boiling range of about 175°–405° F. and a specific gravity of 0.7. The solution is contacted with 20 pounds of a wood-charcoal adsorbent carbon having a pH of 6.8, a bulk density of 16 lb./ft.$^3$, containing 3% moisture and 6% ash and sized such that 85% passes through a 200 mesh screen. After 45 minutes contact at reflux temperature the wax-alkylate-carbon admixture is filtered and a decolorized wax is recovered as in Example 1. The so-refined wax has an ASTM color of 4.5.

Example 15

Example 14 is repeated except that an additional 20 pounds of adsorbent carbon is admixed with the diluted wax prior to contact. The so-refined wax has an ASTM color of 3.5.

Example 16

Example 14 is repeated except that the 20 pounds of the adsorbent carbon is admixed with 20 pounds of the attapulgite of Example 1 and the resulting admixture is contacted with the diluted wax. The so-refined wax has an ASTM color of 2.5.

Example 17

Example 16 is repeated except that the adsorbent used is an admixture of 20 pounds of the adsorbent carbon and 40 pounds of the attapulgite. The so-refined wax has an ASTM color of 2.0.

When the adsorbent used is 60 pounds of a 1:1 carbon-attapulgite admixture the so-refined wax has an ASTM color of 2.0. If this admixture is contacted with the undiluted molten wax the ASTM color of the resulting wax is 2.5.

Example 18

Example 17 is repeated except that 40 pounds of acid-activated clay is substituted for the 40 pounds of attapulgite. The so-refined wax has an ASTM color of L 1.0 and is remarkably improved in odor over the refined wax of Example 17.

Example 19

Example 17 is repeated except that the adsorbent is an admixture of 20 pounds of the adsorbent carbon, 20 pounds of the attapulgite and 20 pounds of the acid-activated clay. The so-refined wax has an ASTM color of 0.5. A refined wax with an ASTM color of 0.5 is also obtained when 20 pounds of bauxite is substituted for the 20 pounds of attapulgite. Contacting with 50% more of either of the adsorbent mixtures of this example does not produce any significant improvement in color. The ASTM colors are slightly darker (around ASTM 1) when mineral spirits is the diluent and the contact is effected at 300° F.

Because of differences in raw materials and process variations by manufacturers of commercial adsorbents, slight differences in the color of the refined wax are encountered when using various brands and grades of a given kind of adsorbent (i.e., clay or activated carbon). However, in all cases a decided improvement results when these varied commercial adsorbents are used in accordance with the teachings of the present invention. For example, even though there are great variations in the activity of adsorbent carbons, depending upon such factors as the surface area of the carbon or its source (bone or wood or mineral oil), there will still be a significant improvement in ASTM color, compared with the use of the adsorbent alone, when the adsorptive carbon is admixed with acid-activated clay and contacted wtih the solvent-diluted, colored wax.

Similarly, commercially available adsorbent clays show fairly great differences in adsorbence and in other properties, such as pH. For example, the pH of commercial acid-activated adsorbent clays may vary from below pH–1 to above pH–5, yet all such clays may advantageously be used in accordance with the present invention; however, the preferred commrecially available acid-activated clays have a pH from about 1.5 to about 4.5.

There is no practical method of evaluating the relative activity of adsorbents and adsorbent admixures other than to run essentially a laboratory duplication of plant clarification conditions. Such an evaluation procedure may be devised for a given plant and a given colored wax by adaptation of the basic techniques and apparatus disclosed in "United States Bureau of Mines Information Circular I. C. 7475" (September 1948). For example, pages 10 to 13 of this circular are specific to the slurry and filtration method and pages 16 to 20 relate to the percolation method.

It can occasionally be advantageous to utilize more than one brand of a given type of adsorbent in a particular adsorbent admixture. Beneficial results can be obtained when the weight ratio of acid-activated clay to total other adsorbents is varied from 4:1 to 1:4. Similarly, concentrations of the mixed adsorbents of from about 15 to over 140 pounds per barrel of wax are beneficial in decolorizing and deodorizing; however, as is illustrated by Example 8 and by the curves shown in the accompanying figure, for a given impure wax and a given adsorbent combination there is frequently a relatively narrow range of dosages which produces the maximum decolorization per pound of adsorbent.

For example, the figure shows that there is a sharp increase in decolorizing ability of a 1:1 weight ratio of activated carbon to acid-activated clay in the range of about 15 pounds per barrel to about 25 pounds per barrel. The curves of the figure were obtained by measuring the light scattering of filtered 10% by volume solutions of decolorized wax in isooctane using a Bryce-Phoenix light scattering photometer. The ordinate represents the percentage of light transmitted by the various solutions and the abscissa shows the corresponding dosage of adsorbent (measured in pounds per 300 pound barrel of wax) used to decolorize 10% by volume solutions of the colored residual wax of Example 15 in isooctane. Contact was for 1 hour at reflux. Curve I was obtained when the adsorbent was an adsorbent carbon having a pH of 5.5, a bulk density of 31 lb./ft.$^3$, 21% ash, 12% moisture and sized such that 70% passes through a 325 mesh screen, and Curve III was obtained by using the acid-activated adsorbent clay of Example 2. In Curve II, the adsorbent was an admixture of equal weights of this clay and this carbon.

It can be seen in the figure that at least the same degree of decolorization is obtained when about 22 pounds and over of the 50–50 admixture is substituted for an equal weight of activated carbon. This substitution is economically advantageous since the activated carbon used costs about six times as much per pound as does the acid-activated clay.

Similarly Example 8 shows that when using a weight mixture of three parts of acid-activated clay to one part of attapulgite, dosages up to about 75 pounds of adsorbent per barrel of wax result in increased decolorizing but that, with this particular impure wax, there appears to be no advantage in increasing the adsorbent dosage over 75 pounds per barrel.

Generally, for a given impure wax, if lighter colors are desired than can be obtained by using the optimum concentration of a given two-component adsorbent admixture, it is not economical to attempt to obtain improved decolorization by increasing the dosage of adsorbent. In such circumstances it is frequently more economical to vary the ratio of acid-activated clay to total other adsorbents in the admixture and/or to add a third component to the admixture, such as is illustrated by the carbon addition of Example 7 and by the novel three-component admixtures of Examples 6 and 19.

Novel three-component admixtures that are of utility in the present invention are listed below:

(1) an admixture of from 20 to 84 parts by weight of acid-activated adsorbent clay with from 15 to 79 parts by weight of naturally occurring bleaching clay and from 1 to 65 parts by weight of adsorbent carbon;

(2) an admixture of from 20 to 85 parts by weight of acid-activated adsorbent clay with from 10 to 75 parts by weight of naturally occurring bleaching clay and from 5 to 70 parts by weight of bauxite;

(3) an admixture of from 20 to 89 parts by weight of acid-activated adsorbent clay with from 10 to 79 parts by weight of bauxite and from 1 to 70 parts by weight of adsorbent carbon.

In some instances additional benefit may be derived by using a novel four-component adsorbent admixture of from 20 to 86 parts by weight of acid-activated adsorbent clay with 10 to 76 parts by weight of naturally occurring bleaching clay, 3 to 69 parts by weight of bauxite and 1 to 67 parts by weight of adsorbent carbon.

Although slight benefits may be obtained when using such three and four component mixtures containing as little as 10% by weight or as much as 90% by weight of an acid-activated adsorbent clay, it is generally of much greater benefit to use admixtures wherein the weight ratio of acid-activated adsorbent clay to total other adsorbents is from 1:4 to 4:1.

When refining wax in accordance with the present invention it is essential that the wax diluent be substantially nonpolar in character since solvents which are highly polar in nature, such as methyl ethyl ketone, tend to lessen the activity of the adsorbent mixture. In fact, the lower the degree of polarity of the solvent, the greater the activity of the adsorbent at a given contact temperature. Thus, a substantially non-polar solvent such as 1,4-dimethylnaphthalene is operable in the present invention but is appreciably less effective than isooctane, which is comparatively less polar. Similarly the free moisture content (e.g., removable below 220° F.) of the adsorbent should be relatively low when contact is below the boiling point of the water in the system in order to prevent "deactivation" of the adsorbent by the highly polar water. In this respect, in order to minimize the deactivating effect of moisture in the adsorbent, it is advantageous to use a substantially non-polar solvent which, in combination with the wax and moisture, produces a mixture which refluxes above about 200° F. or to use a solvent from which the water may be distilled prior to reaching contact temperature. Operation below about 200° F., under non-reflux conditions, requires that the adsorbent admixture be substantially free of "uncombined" water; therefore, either the individual components or the admixture per se should be "activated" by such well known procedures as roasting.

Among the operable solvents are octane, isooctane, and other trimethylpentanes, the dimethyl hexanes, aviation alkylate, mineral spirits, decahydronaphthalene, carbon tetrachloride, and trichloroethane.

Isooctane and aviation alkylate are readily removable from the wax by distillation or by cooling the wax-solvent solution and separating the liquid solvent and crystallized wax. In commercial operation with the lower boiling non-polar solvents (such as isooctane) pressure filtration can be used to reduce filtration time.

With the proper choice of solvent, contact temperatures as high as about 400° F. may be used. However, care must be taken when operating above about 300° F. to insure that the adsorbent admixture does not have any substantial catalytic activity with regard to cracking or oxidation. That is, where the adsorbent mixture contains relatively large quantities of acid-activated adsorbent carbon, operation at higher temperatures tends to produce discolored products, apparently due to catalytically accelerated oxidation reactions. Similarly at temperatures above about 300° F. the wax produced may be discolored due to hydrocarbon cracking catalyzed by the adsorbent.

The invention claimed is:

1. In the refining of a colored petroleum wax the improvement which comprises diluting the wax with a non-polar solvent and contacting the resulting solution with an adsorbent admixture comprising at least one acid-activated adsorbent clay containing montmorillonite and a second adsorbent selected from the class consisting of naturally occurring bleaching clays, adsorbent carbon, bauxite, and mixtures thereof, the weight ratio of said acid-activated clay to said second adsorbent being from 4:1 to 1:4.

2. The method according to claim 1 in which the weight ratio of acid-activated clay to said second adsorbent is from about 2:1 to about 1:1 and wherein said second adsorbent is adsorbent carbon.

3. The method according to claim 1 in which attapulgite is the naturally occurring bleaching clay.

4. The method according to claim 1 in which the colored petroleum wax has a melting point above 140° F. and an ASTM color greater than 4.

5. The method according to claim 4 wherein the colored wax contains less than 2% of oil and the final decolorized wax has an ASTM color of less than 1.0.

6. The method according to claim 4 in which the second adsorbent is attapulgite.

7. The method according to claim 4 in which the acid-activated adsorbent clay is characterized by having a pH in 25% aqueous suspension of 1.5 to 4.5 at 70° F.

8. The method according to claim 1 in which the adsorbent comprises an admixture of from 20 to 84 parts by weight of acid-activated adsorbent clay containing montmorillonite, from 1 to 65 parts by weight of adsorbent carbon, and from 15 to 79 parts by weight of naturally occurring bleaching clay.

9. The method according to claim 1 in which the adsorbent comprises an admixture of from 20 to 85 parts by weight of acid-activated adsorbent clay containing montmorillonite, from 10 to 75 parts by weight of naturally occurring bleaching clay, and from 5 to 70 parts by weight of bauxite.

10. The method according to claim 1 in which the adsorbent comprises an admixture of from 20 to 89 parts by weight of acid-activated adsorbent clay, containing montmorillonite, from 10 to 79 parts by weight of bauxite, and from 1 to 70 parts by weight of adsorbent carbon.

11. The method according to claim 1 in which the adsorbent comprises an admixture of from 20 to 86 parts by weight of acid-activated adsorbent clay containing montmorillonite, from 3 to 69 parts by weight of bauxite, from 1 to 67 parts by weight of adsorbent carbon, and from 10 to 76 parts by weight of naturally occurring bleaching clay.

12. The adsorbent admixture of claim 8.

13. The adsorbent admixture of claim 9.

14. The adsorbent admixture of claim 10.

15. The adsorbent admixture of claim 11.

16. Method for refining microcrystalline waxes comprising diluting a colored petroleum wax fraction which melts above about 140° F. with from 1 to 10 volumes of a non-polar hydrocarbon solvent for wax having a boiling point above the melting point of said residual wax fraction, contacting the wax, under temperature and pressure conditions such that the wax remains in solution but does not become discolored or degraded by chemical reaction, with from 4 to 35 weight percent of and adsorbent mixture comprising acid-activated montmorillonite clay and from 20% to 80% by weight of a second adsorbent which is bauxite, or a naturally occurring bleaching clay or a mixture of bauxite and naturally occurring bleaching clay, then adding from 1 to 10 pounds per bbl. of activated carbon adsorbent, contacting the resulting slurry for a further period of at least 5 minutes, and recovering a refined wax characterized by having an ultraviolet absorbency of less than 0.15 measured at 280 millimicrons when extracted and tested by the Howard-Haenni-Joe method.

17. The method according to claim 16 wherein the second adsorbent it attapulgite.

18. The method according to claim 16 wherein the second adsorbent consists of attapulgite and bauxite.

References Cited

UNITED STATES PATENTS

| | | | |
|---|---|---|---|
| 2,103,504 | 12/1937 | Whiteley et al. | 208—26 |
| 2,202,806 | 5/1940 | Alton | 208—306 |
| 2,346,127 | 4/1944 | Simpson et al. | 208—307 |
| 2,387,171 | 10/1945 | Morgan et al. | 208—26 |
| 2,596,942 | 5/1952 | Robertson et al. | 208—26 |
| 2,781,301 | 2/1957 | Payne | 260—708 |
| 2,949,421 | 7/1960 | Mills | 208—299 |
| 2,985,538 | 5/1961 | Padgett et al. | 208—21 |
| 3,055,791 | 9/1962 | Elias | 208—26 |

FOREIGN PATENTS 734,200 8/1952 Great Britain.

DANIEL E. WYMAN, *Primary Examiner.*

P. KONOPKA, *Assistant Examiner.*